No. 778,096. Patented December 20, 1904.

UNITED STATES PATENT OFFICE.

JOHN W. BARNES, OF PHILADELPHIA, PENNSYLVANIA, ASSIGNOR OF ONE-HALF TO CLARA G. HOBSON, OF PHILADELPHIA, PENNSYLVANIA.

PROCESS OF MAKING COAL BRIQUETS.

SPECIFICATION forming part of Letters Patent No. 778,096, dated December 20, 1904.

Application filed October 22, 1904. Serial No. 229,517.

*To all whom it may concern:*

Be it known that I, JOHN W. BARNES, a citizen of the United States, residing in the city and county of Philadelphia, in the State of Pennsylvania, have invented certain new and useful Improvements in Processes of Making Coal Briquets, of which the following is a full, clear, and exact description.

This invention has for its object the production of improved briquets of coal which may be cheaply made and will retain their form and integrity under all atmospheric conditions and when used in suitable furnaces will give a high degree of heat with a minimum of smoke.

In carrying out my invention I take a definite quantity of granulated coal—say, for example, two thousand pounds—the grains being, preferably, about one-eighth of an inch in diameter. I then mix intimately with the same a mixture consisting of about three gallons, or thirty-six pounds, of refuse molasses, preferably what is known as "foundry-molasses," which is a refuse molasses commonly used for molding purposes in foundries, or other saccharine matter and about one-half pound of crude-paraffin wax, which is liquefied by adding the same to hot water, the quantity of water used being sufficient to permit the coal, &c., to be readily formed into briquets. These briquets being made are then subjected to a temperature of about 280° to 300° Fahrenheit, but not exceeding 300°, until dried. I then take about one and a half pounds of crude paraffin and melt the same in a suitable quantity of hot water and sprinkle this mixture over the briquets, which absorb the paraffin with the water. The briquets are then allowed to dry and are then ready for use.

The molasses serves to bind the particles of coal together and the paraffin to protect the same from absorption of moisture from the atmosphere and also to furnish easily-igniting fuel that serves to start the coal into combustion.

Sometimes in lieu of mixing the paraffin with the coal before making the latter into briquets I may use about two pounds of the paraffin in hot water for sprinkling the briquets after the same have been made and subjected to heat, as before described.

Having described my invention, I claim as new and desire to secure by Letters Patent—

1. The hereinbefore-described process of making briquets of coal, consisting in intimately mixing in the proportions substantially as recited, granulated coal, molasses, and paraffin, and hot water, then forming the mass into briquets, then subjecting the same to a temperature of from 280° to 300° Fahrenheit, and then sprinkling said briquets with a mixture of paraffin and hot water, and finally drying the briquets, substantially as set forth.

2. The hereinbefore-described process of making briquets of coal, consisting in intimately mixing, in the proportions substantially as recited, granulated coal, molasses, and water, then forming the mass into briquets, then subjecting the same to a temperature of from 280° to 300° Fahrenheit, and then sprinkling said briquets with a mixture of paraffin and hot water, and finally drying the briquets, substantially as set forth.

In testimony whereof I have hereunto affixed my signature.

JOHN W. BARNES.

Witnesses:
WALTER C. PUSEY,
J. HOWARD REBER.